US012585461B1

(12) United States Patent
Saha et al.

(10) Patent No.: US 12,585,461 B1
(45) Date of Patent: Mar. 24, 2026

(54) DEVICES, SYSTEMS, AND METHODS FOR AUTOMATING EVIDENCE COLLECTION FOR SOFTWARE COMPLIANCE

(71) Applicant: Morgan Stanley Services Group Inc., New York, NY (US)

(72) Inventors: Mainak Saha, Charlotte, NC (US); Arnab Ghosh, Fort Mill, SC (US); Calum B. Courtney, New York, NY (US); Pradeep Sundaram, Princeton Junction, NJ (US); Samer Abraham, Paramus, NJ (US); Paul Waters, Chicago, IL (US); Shayan Shafizadeh, Great Neck, NY (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 19/039,399

(22) Filed: Jan. 28, 2025

(51) Int. Cl.
*G06F 8/70* (2018.01)
*G06F 8/10* (2018.01)

(52) U.S. Cl.
CPC . *G06F 8/70* (2013.01); *G06F 8/10* (2013.01)

(58) Field of Classification Search
CPC .................................... G06F 8/70; G06F 8/10
USPC .............................. 717/115–140; 706/25–45
See application file for complete search history.

(56) References Cited

U.S. PATENT DOCUMENTS

| | | | | |
|---|---|---|---|---|
| 7,076,788 B1 * | 7/2006 | Lahde | ....................... | G06F 8/10 717/123 |
| 8,397,210 B2 * | 3/2013 | Dutta | ....................... | G06F 8/10 717/104 |
| 9,942,114 B1 * | 4/2018 | Arora | .................. | G06F 11/3051 |
| 9,952,832 B2 * | 4/2018 | Sridhar | .............. | G06Q 10/0631 |
| 11,157,272 B2 | 10/2021 | Woulfe | | |
| 11,748,414 B2 * | 9/2023 | Mohanty | .............. | G06N 3/0442 707/739 |
| 11,824,646 B1 * | 11/2023 | Muddu | ................... | H04L 63/20 |
| 11,968,088 B1 * | 4/2024 | Yan | ...................... | H04L 41/0823 |
| 11,978,273 B1 * | 5/2024 | Ramaswamy | ......... | G06N 3/045 |
| 12,130,848 B1 * | 10/2024 | Koneru | .................. | G06F 40/40 |
| 12,314,745 B1 * | 5/2025 | Cichy | .................. | G06Q 20/405 |
| 12,321,725 B1 * | 6/2025 | Wilson | ..................... | G06F 8/36 |

(Continued)

OTHER PUBLICATIONS

Kim et al, "LLM-based Methodology for Expanding 3D Metadata in Point Cloud", IEEE, pp. 1-3 (Year: 2025).*

(Continued)

*Primary Examiner* — Anil Khatri
(74) *Attorney, Agent, or Firm* — K&L Gates LLP

(57) ABSTRACT

A system for automating evidence collection for software compliance is disclosed herein. The system can include a user computer device, a plurality of repositories, a backend computer system. The backend computer system can store a collection engine comprising a large language model ("LLM") that, when executed by a processor, causes the backend computer system to extract metadata from a software architecture diagram and metadata from repository information, map the software architecture diagram to the at least one repository of the plurality of repositories based on the extracted metadata, generate a prompt to retrieve evidence from the plurality of repositories based on the mapping, and retrieve evidence relevant to the at least one requirement from the plurality of repositories based on the prompt.

21 Claims, 8 Drawing Sheets

(56)           References Cited

U.S. PATENT DOCUMENTS

| | | |
|---|---|---|
| 2024/0028302 A1 | 1/2024 | Maciver et al. |
| 2024/0160742 A1 | 5/2024 | Sami |
| 2024/0333743 A1 | 10/2024 | Bazalgette et al. |
| 2024/0345993 A1 | 10/2024 | Madisetti et al. |
| 2025/0086308 A1* | 3/2025 | Crume ................... G06N 5/025 |

OTHER PUBLICATIONS

Jiang et al, "Self-Planning Code Generation with Large Language Models", ACM, pp. 1-30 (Year: 2024).*
Guerra et al, "Assessing LLMs for Front-end Software Architecture Knowledge" IEEE, pp. 1-5 (Year: 2025).*
Tagliaferro et al, "Leveraging LLMs to Automate Software Architecture Design from Informal Specifications" IEEE, pp. 1-9 (Year: 2025).*
Liang et al, "Computing Architecture for Large-Language Models (LLMs) and Large Multimodal Models (LMMs)", ACM, pp. 1-2 (Year: 2024).*

* cited by examiner

200

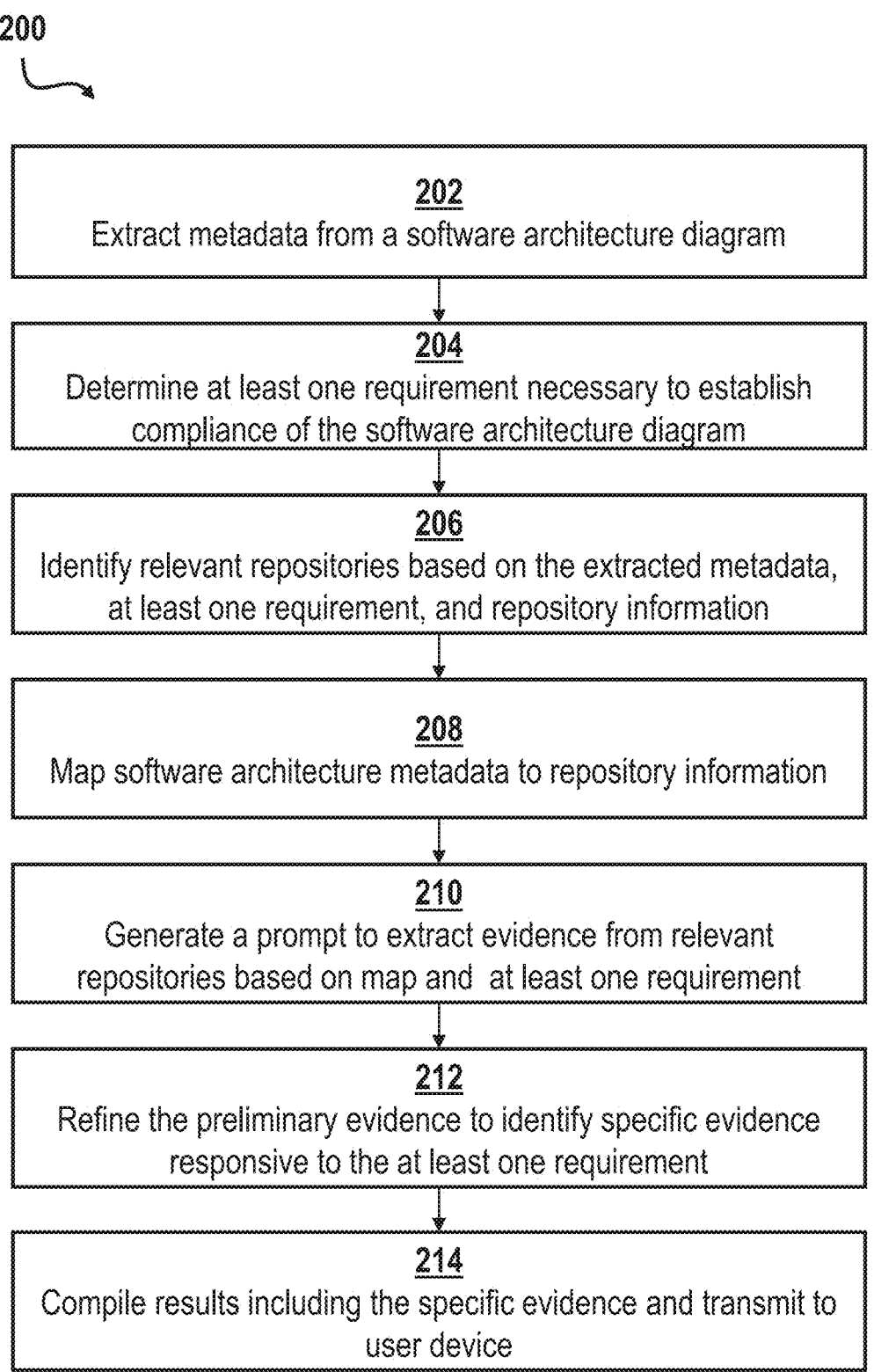

202
Extract metadata from a software architecture diagram

204
Determine at least one requirement necessary to establish compliance of the software architecture diagram

206
Identify relevant repositories based on the extracted metadata, at least one requirement, and repository information

208
Map software architecture metadata to repository information

210
Generate a prompt to extract evidence from relevant repositories based on map and at least one requirement

212
Refine the preliminary evidence to identify specific evidence responsive to the at least one requirement

214
Compile results including the specific evidence and transmit to user device

REPOSITORY MAPPING

| ☐ 602 Select All | 606 Repository Description | 608 Location |
|---|---|---|
| ☐ 604ₐ | Repository #1 | Location #1 |
| ☐ 604_b | Repository #2 | Location #2 |
| ☐ 604_c | Repository #3 | Location #3 |
| ☐ 604_d | Repository #4 | Location #4 |
| ☐ 604_e | Repository #5 | Location #5 |

FIG. 6A

600$_b$
REQUIREMENT PROVISION

| ☐ 610 Select All | 614 Requirement Description |
|---|---|
| ☐ ∿612$_a$ | Requirement #1 |
| ☐ ∿612$_b$ | Requirement #2 |
| ☐ ∿612$_c$ | Requirement #3 |
| ☐ ∿612$_d$ | Requirement #4 |
| ☐ ∿612$_e$ | Requirement #5 |

FIG. 6B

600c
EVIDENCE APPROVAL

| 616 Requirement | 618 Evidence? | 620 Description | 622 Location | 622 Comments | 624 Approve? |
|---|---|---|---|---|---|
| Requirement #1 | Found | Description #1 | Location #1 | Comment #1 | Approved ▽ |
| Requirement #2 | Found | Description #2 | Location #2 | Comment #2 | Approved ▽ |
| Requirement #3 | Found | Description #3 | Location #3 | Comment #3 | Rejected ▽ |
| Requirement #4 | Found | Description #4 | Location #4 | Comment #4 | Approved ▽ |
| Requirement #5 | Not Found | NA | NA | NA | NA ▽ |

626
Submit

628
Export

FIG. 6C

DEVICES, SYSTEMS, AND METHODS FOR AUTOMATING EVIDENCE COLLECTION FOR SOFTWARE COMPLIANCE

BACKGROUND

In software development, evidence collection represents an important means of establishing and maintaining proper software architecture and compliances. For example, collecting the right evidence (e.g., excerpts of code) can demonstrate that newly developed software adheres to a set of established rules, standards, and regulations, including architectural requirements, security guidelines, data privacy laws, industry best practices, and company policies. The right evidence can ensure the quality, safety, and ethical development of software throughout its lifecycle.

However, identifying and obtaining the right evidence can be cumbersome. Existing procedures for evidence collection are predominantly manual, which can be time consuming, labor intensive, and prone to errors. To the extent that custom-built scripts are implemented, these depend on repetition to ensure consistency and, therefore, are inflexible and cannot produce accurate results beyond their specifically intended purpose. Such scripts are not scalable and are inappropriate for larger enterprises that develop code for a multitude of purposes. Accordingly, conventional means for evidence collection are either inefficient or inflexible and error-prone, which can lead to delays and compliance issues. Accordingly, there is a need for devices, systems, and methods for improved automation of evidence collection for software development compliance. Such devices, systems, and methods can streamline the evidence collection process by autonomously identifying and collecting relevant code snippets for a particular task, which can significantly reduce manual labor while accelerating the overall evidence collection process without compromising the results.

SUMMARY

In one general aspect, the present invention is directed to a system for automating evidence collection for software compliance. The system can include a user computer device, a plurality of repositories, and a backend computer system. The backend computer system can receive user inputs from the user computer device, including software architecture diagrams, requirements for software compliance, and/or repository information associated with at least one repository from the plurality of repositories. The backend computer system can further store a collection engine comprising a large language model ("LLM") that, when executed by a computer system (having one or more processors), causes the backend computer system to extract metadata from received software architecture diagrams and repository information. Based on the extracted metadata, the LLM can map a software architecture diagram to at least one repository of the plurality of repositories. The LLM can further identify a relevant template from a plurality of templates and generate a prompt to retrieve evidence from the plurality of repositories based on the mapping and the identified template. Thus, the prompt can cause the backend computer system to retrieve evidence relevant to the software diagram and the at least one requirement from the plurality of repositories. These and other benefits that can be realized through embodiments of the present invention will be apparent from the description below.

FIGURES

Various aspects of the present invention are described herein by way of example in connection with the following figures.

FIG. 2 is an algorithmic flow diagram of a method of automating evidence collection for software development compliance according to one embodiment of the present disclosure.

Figure 1:
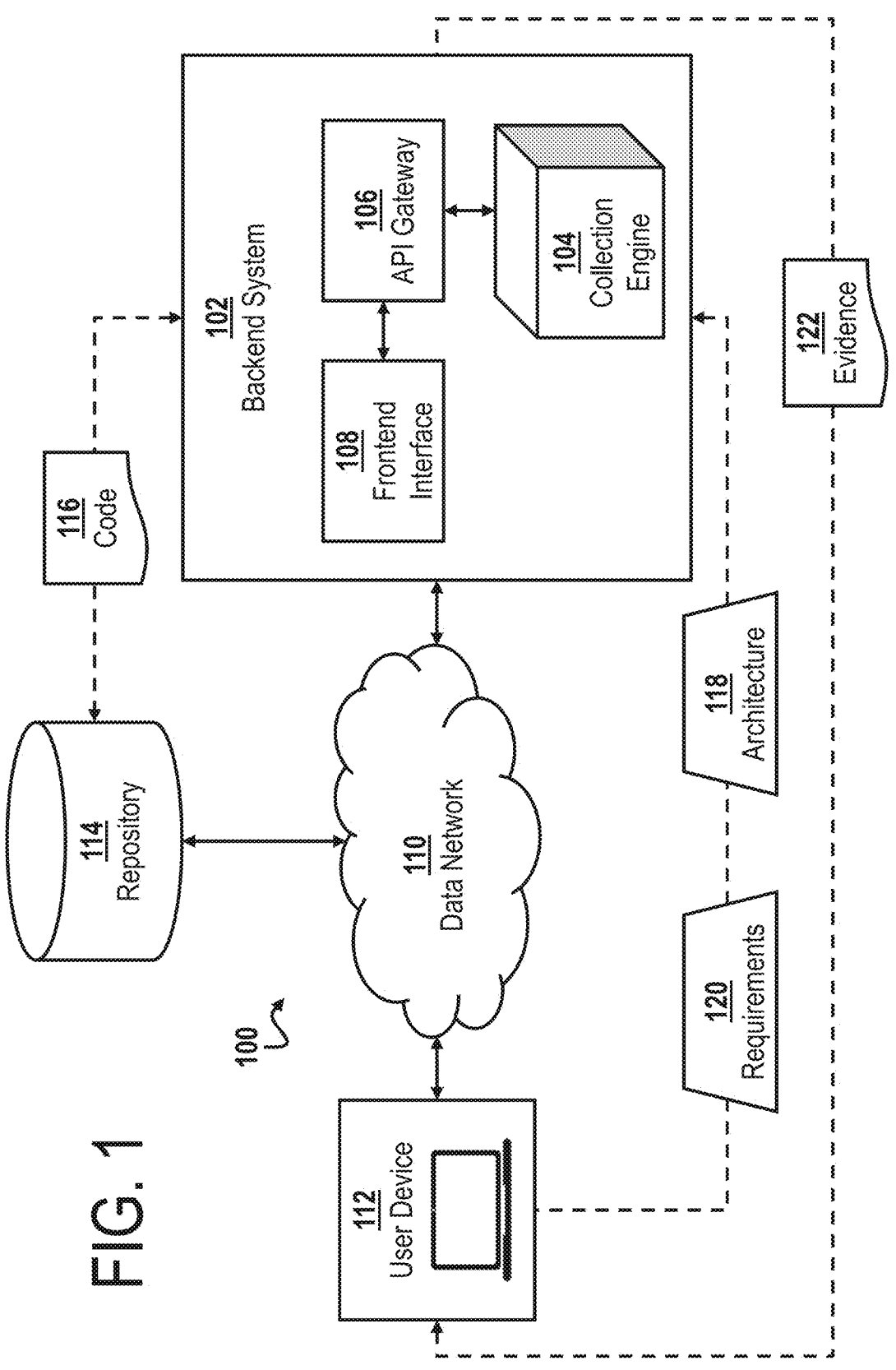
FIG. 1 is a block diagram of a system configured to autonomously collect evidence for software compliance according to one embodiment of the present disclosure.

FIGS. 6A-C are user interfaces 600$_{a-c}$ configured for use with the system of FIG. 1 according to at least one embodiment.

DESCRIPTION

In modern software development, securing and auditing code is crucial but often challenging due to the manual effort required in locating specific code snippets for architectural reviews. Conventional devices, systems, and methods require significant manual intervention and, therefore, are time-consuming and error-prone, leading to delays and potential compliance issues. Additionally, conventional devices, systems, and methods may rely on scripts, which are narrowly tailored for specific tasks and, therefore, are inflexible, unscalable, and limited in their application.

Contrarily, the devices, systems, and methods disclosed herein can facilitate the efficient and automated extraction of necessary evidences (e.g., code snippets), which can significantly reduce manual effort and increase accuracy for a large number of software architectures. Specifically, the devices, systems, and methods disclosed herein can be specifically configured to autonomously extract metadata from a provided architecture diagrams. The metadata can provide the devices, systems, and methods disclosed herein with details regarding the architecture and design of a software under audit. Based on the metadata, the devices, systems, and methods disclosed herein can identify specific evidence needed to establish compliance.

Having extracted the metadata, the devices, systems, and methods disclosed herein can parse and understand the structure and content of repositories to facilitate efficient navigation and autonomous location and extraction of evidence to establish compliance with a particular set of requirements. The retrieved evidence is sure to be contextually relevant to not only the architecture but the required criteria. Such automation not only expedites the compliance process but also reduces human error, leading to a more efficient and reliable security verification workflow. Moreover, because the devices, systems, and methods disclosed herein are adaptable, the devices, systems, and methods disclosed herein can be implemented to ensure the compliance of a variety of different architectures to a variety of different requirements.

Referring now to FIG. 1, a block diagram of a system 100 configured to autonomously collect evidence for software compliance is depicted according to one embodiment of the present disclosure. The system 100 can exist within a deployment environment, such as an enterprise computing system. According to the embodiment of FIG. 1, the system 100 can include a backend computer system 102, one or more file repositories 114 of a plurality of repositories, and a user computer device 112 communicatively coupled via an electronic data network 110, such as the Internet or an Intranet. For example, the electronic data network 110 can facilitate a secure, Hypertext Transfer Protocol Secure ("HTTPS") connections over Secure Socket Layer ("SSL") ports. The backend computer system 102 can implement a collection engine 104 to automate evidence collection. The collection engine 104, for example, can include a machine learning model, such as a large language model, a rule-based model (e.g., structured task models, etc.), a traditional machine learning model (e.g., decision trees, random forests, gradient boosting, support vector machines, logistic regression models, etc.), a symbolic artificial intelligence model (e.g., expert systems, ontology models, knowledge graph models, etc.), a small/domain-specific model (e.g., transformer-based models, etc.), or a probabilistic model (e.g., Bayesian networks, Markov chains, etc.), amongst others. For example, according to some non-limiting embodiments, the backend computer system 102 can include a sub-system architecture 400 (FIG. 4) that utilizes a set of GPUs (graphical processing units), TPUs (tensor processing units), and/or CPUs, as will be described in further detail with referenced to FIG. 4.

According to the embodiment of FIG. 1, the user computer device 112 can include a laptop computer, a desktop computer, a server, or a smartphone, amongst other devices communicatively couplable to the electronic data network 110. The user computer device 112 can communicate with the collection engine 104 via a front-end interface 108 that interacts with the collection engine 104 via an application protocol interface ("API") gateway 106, for example. The end user, at the user computer device 112, can interact with the collection engine 104 through a user interface, which can be a web application, an application, a chat widget embedded in a website, or a desktop application, for example. Such user interfaces will be described in further detail with reference to FIGS. 6A-C. For example, the user interfaces displayed via the user computer device 112 can provide one or more input fields where users can provide information (e.g., one or more requirements 120, software architecture information 118, prompts, approvals of collected evidence, etc.). The user interfaces can further include a display area where the responses from various models employed by the collection engine 104, such one or more large language models ("LLM"), can be displayed or downloaded to the user computer device 112. Such responses, for example, can include evidence information 122 the collection engine 104 evaluated for relevance to the one or more requirements 120. The evidence information 122 can include either the actual excerpt of code, a pin-point location associated with the excerpt of code, or any other information associated with the excerpt of code.

The front-end interface 108 can be implemented with a web server that hosts the user interface and manages the initial HTTP requests from the user computer device 112. The API gateway 106 can route user inputs (e.g., one or more requirements 120, software architecture information 118, prompts, approvals of collected evidence, etc.) to the various models employed by the collection engine 104. Once the collection engine 104 generates a response, the API gateway 106 can route the response to the front end interface

108 for sending on to the user computer device 112. The API gateway 106 can serve as a single entry point for all client requests, simplifying the interaction between the clients and the collection engine 104. The API gateway 106 can be implemented with a software layer that can be deployed server of the backend computer system 102. According to some embodiments, the backend computer system 102 can be implemented multiple servers, such as in a cloud computing environment.

As will be described in further detail herein. The data collection engine 104 can utilize an LLM model configured to autonomously generate prompts based on user inputs (e.g., one or more requirements 120, software architecture information 118, feedback, etc.) provided via the user computer device 112, which causes one or more other LLM models of the data collection engine 104 to identify one or more repositories 114 of a plurality of repositories most relevant to the software architecture information 118, and retrieve not just the most relevant files stored in the one or more repositories 114, but the specific lines of code 116 from those files that are most relevant to establish compliance with the one or more requirements 120.

Referring now to FIG. 2, an algorithmic flow diagram of a method 200 of automating evidence collection for software compliance is depicted in accordance with at least one embodiment of the present disclosure. It shall be appreciated that the method 200 can be employed by the backend computer system 102 (FIG. 1) and, more specifically, by the collection engine 104 (FIG. 1) employed by the backend computer system (FIG. 1). According to FIG. 2, the method 200 can include extracting 202 metadata from the software architecture information 118 (FIG. 1). The software architecture diagram, for example, can be provided via the user computer device 112 (FIG. 1), retrieved by the backend computer system 102 (FIG. 1), stored on the backend computer system 102 (FIG. 1), or otherwise received by the collection engine 104 (FIG. 1) as an input. Specifically, the collection engine 104 (FIG. 1) can extract metadata from the software architecture information 118 (FIG. 1), which can include information about system components, interactions, and other relevant details about the software under audit, which may be relevant to identifying the correct evidence necessary to establish compliance. It shall be appreciated that automating such extraction can save an immense amount of man hours, especially when performed at scale.

In further reference to FIG. 2, the method 200 can include determining 204 at least one requirement 120 (FIG. 1) necessary to establish compliance of the software architecture information 118 (FIG. 1). For example, according to the embodiment of FIG. 1, the at least one requirement 120 (FIG. 1) can be provided to the backend computer system 102 (FIG. 1) by the user computer device 112 (FIG. 1). However, according to other embodiments, the system 100 (FIG. 1)—and specifically, the collection engine 104 (FIG. 1) employed by the backend server 102—can be configured to autonomously determined the at least one requirement necessary to establish compliance based on the received software architecture information 118 (FIG. 1). The method 200 can further include identifying 206 a relevant repository 114 (FIG. 1) based on the extracted metadata and the at least one requirement 120 (FIG. 1) necessary to establish compliance of the software architecture information 118 (FIG. 1). For example, using the extracted metadata, the collection engine 104 (FIG. 1) can algorithmically detect and identify the right repository 114 (FIG. 1) within an organization's source code management system where the relevant evidence might be located. Accordingly, according to some embodiments, the method 200 can further include receiving repository information from an organization's source code management system.

Still referring to FIG. 2, the method 200 can further include generating 208 a map of the extracted metadata from the software architecture information 118 (FIG. 1) and the repository information (e.g., repository metadata, commit histories, etc.) and generating 210 a prompt to extract evidence from the repository based on the generated map. As will be described in further reference to FIG. 5, a template model 512 can generate such prompts based on user inputs (e.g., software architecture diagrams, one or more requirements, configurable settings, feedback, etc.), the generated map, and/or a selected template from a plurality of templates 514$_{a-c}$. For example, once the appropriate repositories are identified, mapping the extracted metadata from the software architecture information 118 (FIG. 1) and the repository information (e.g., repository metadata, commit histories, etc.) can enable the collection engine 104 (FIG. 1) to precisely target a search for evidence (e.g., code snippets) stored in the repository 114 (FIG. 1). In other words, the extracted metadata from the software architecture information 118 (FIG. 1) and the repository information (e.g., repository metadata, commit histories, etc.) tell the collection engine 104 (FIG. 1) where to look for the most relevant evidence associated with different systems and/or interactions of the architecture that are under audit. The evidence extraction can include querying the repository 114 (FIG. 1) for files and code segments that likely contain the needed evidence based on the at least one requirement 120 (FIG. 1).

The method 200 of FIG. 2 can further include refining 212 the preliminary evidence to identify specific evidence responsive to the at least one requirement. According to some embodiments, the refinement can be performed via a large language model ("LLM") of the collection engine 104 (FIG. 1), which can analyze the context and semantics of code within the preliminary evidence to identify specific pinpoint snippets that can qualify as evidence relevant to the at least one requirement 120 (FIG. 1). Natural language processing and machine learning techniques can be implemented for enhanced comprehension of code structure and/ or semantics, thereby enhancing the relevance of specific evidence to the at least one requirement 120 (FIG. 1) and efficiency by which the system 100 (FIG. 1) can retrieve the specific evidence from the preliminary evidence stored in the repository 114 (FIG. 1). Once the specific evidence has been retrieved, the method 200 can further include compiling 214 the results, which can include at least one piece of specific evidence extracted based on the at least one requirement 120 (FIG. 1) and/or the preliminary evidence, and transmitting the compiled results to the user computer device 112 (FIG. 1). For example, compilation can include verifying all the retrieved code snippets for relevance and packaging them into a structured format, which can be delivered as a compiled as outputs or responses that include evidence information 122 (FIG. 1) to the user computer device 112 (FIG. 1), for review and further action to be implemented via a security architecture team. The evidence information 122 (FIG. 1) can include either the actual excerpt of code, a pin-point location associated with the excerpt of code, or any other information associated with the excerpt of code.

Accordingly, by automating the steps of the method 200 of FIG. 2, it shall be appreciated that the devices, systems, and methods disclosed herein can significantly reduce the manual effort required by developers to find relevant code evidences, streamlining the compliance process and enhancing the accuracy and speed of security audits.

Figure 3:
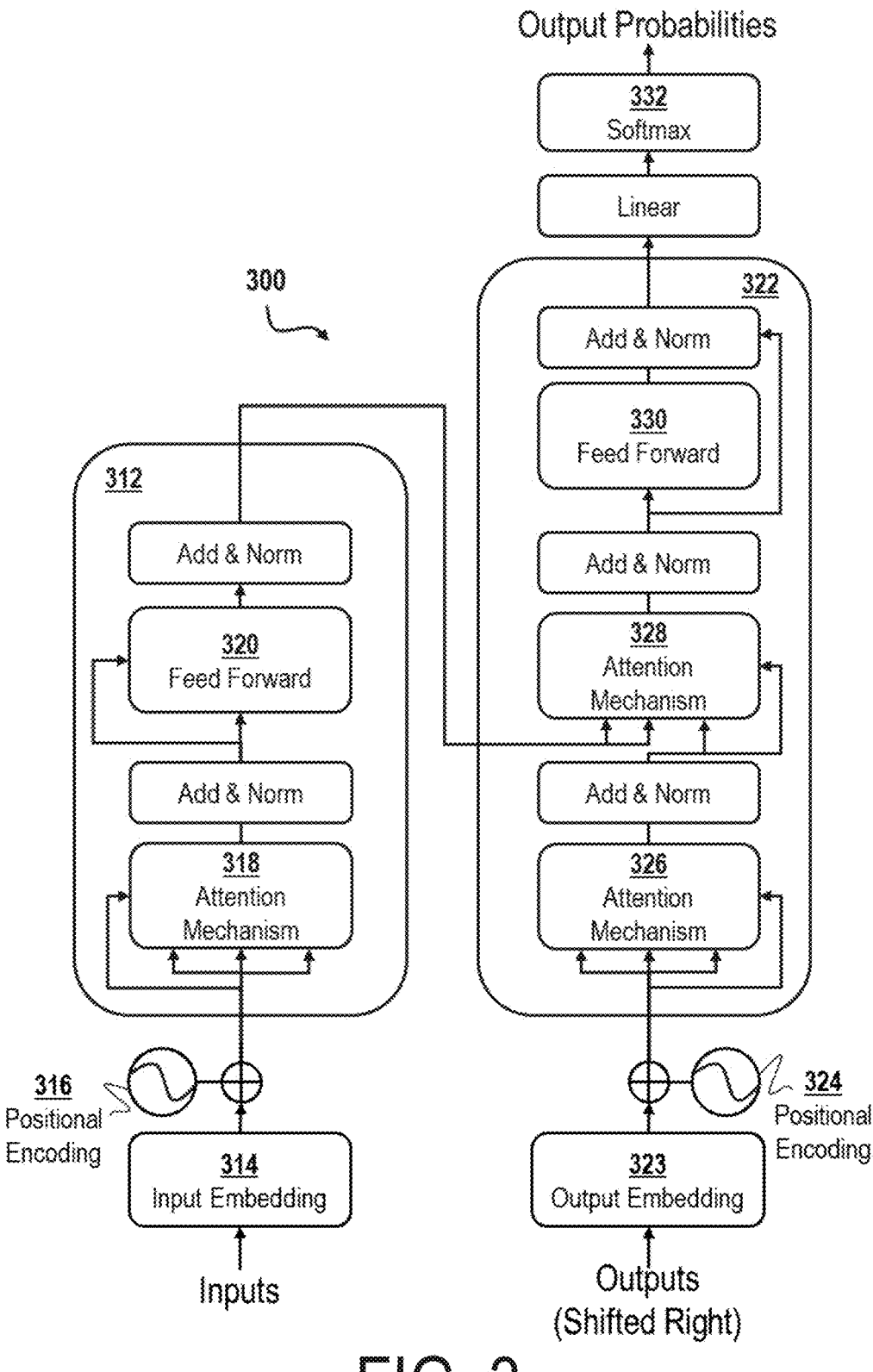
FIG. 3 is a generalized block diagram of a large language model configured for use by the system of FIG. 1 according to one embodiment of the present disclosure.

Referring now to FIG. 3, a generalized block diagram of an LLM 300 configured for use via the system 100 of FIG. 1 is depicted in accordance with at least one embodiment of the present disclosure. According to the non-limiting embodiment of FIG. 3, the LLM can be at least a component of the collection engine 104 (FIG. 1) employed by the backend computer system 102 (FIG. 1) to perform the method 200 of FIG. 2. However, according to other embodiments, the collection engine 104 (Figure) can include other machine learning models, rule-based models (e.g., structured task models, etc.), traditional machine learning models (e.g., decision trees, random forests, gradient boosting, support vector machines, logistic regression models, etc.), symbolic artificial intelligence models (e.g., expert systems, ontology models, knowledge graph models, etc.), small/ domain-specific models (e.g., transformer-based models, etc.), or probabilistic models (e.g., Bayesian networks, Markov chains, etc.), amongst others.

It shall be appreciated that the LLM 300 can include a type of artificial intelligence algorithm that applies neural network techniques with many parameters to process and understand human languages or text using self-supervised learning techniques. The LLM 300 can operate on the principles of deep learning, leveraging neural network architectures to process and understand human languages. The LLM 300 of FIG. 3, for example, can be trained on vast datasets using self-supervised learning techniques. The core of the LLM's 300 functionality lies in the intricate patterns and relationships it learns from diverse language data during training. As depicted in FIG. 3, the LLM 300 can consist of multiple layers (e.g., feedforward layers, embedding layers, and attention layers, etc.). The LLM 300 can employ attention mechanisms, like self-attention, to weigh the importance of different tokens in a sequence, allowing the LLM 300 to capture dependencies and relationships.

In further reference to FIG. 3, the LLM model 300 can include a transformer-based architecture, which is a type of neural network designed for natural language processing ("NLP") tasks. For example, transformer-based architecture of the LLM 300 of FIG. 3 model can include an encoder component 312, a decoder component 322, a feed-forward neural network ("FFNN") 330, one or more attention mechanisms 318, 326, 328, one or more positional encoders 316, 324, and other components configured for layer normalization and residual connections. The LLM 300 can be configured to utilize tokens as a basic units of input to its transformer-based architecture. Such tokens, for example, can include words, sub-words, characters, or other elements, depending on the tokenization method used. Generally, tokens can include discrete elements that the LLM 300 uses to understand and generate text. Tokens, for example, can include numerical representations of the textual data that the LLM 300 is implemented to process, such as information (e.g., metadata, histories, code excerpts, etc.) associated with repositories 114 (FIG. 1), code 116 (FIG. 1), requirements 120 (FIG. 1), and/or software architectures 118 (FIG. 1). Tokens can be generated via a tokenization process, which converts raw text into a sequence of tokens. After tokenization, tokens are usually converted into numerical representations (e.g., token IDs) configured for processing via the LLM 300. Tokenization can be accomplished via a specific vocabulary employed via the LLM 300, which can map each token to a unique integer. These token IDs can be transformed into dense vectors (e.g., embeddings) that capture semantic information. Embeddings can be high-dimensional representations where tokens with similar meanings can be located close to each other in the vector space.

According to FIG. 3, the encoder component 312 can be configured to receive an input sequence and transform it into a sequence of continuous representations. For example, an input embedding layer 314 can be configured to convert words or tokens into dense vectors of a fixed size. A first positional encoding component 316 can be configured to add information about the position of each token in the sequence since the LLM 300 may not be configured to inherently understand token order. These positional encodings can be added to the input embeddings received from the input embedding layer 314. A first attention mechanism 318 (e.g., self-attention, multi-head attention, etc.) can be configured to enable the LLM 300 to focus on different parts of the input sequence when encoding a particular token. The first attention mechanism 318 can be configured to calculate a weighted sum of the input values, wherein the weights can be determined by the similarity between the token being processed and other tokens in the sequence. An FENN 320 (e.g., an encoder FFNN) can implement a multi-layered network to process the output of the first attention mechanism 318. As depicted in FIG. 3, each sub-layer (e.g., first attention mechanism 318, FFNN 20) of the encoder component 312 can be configured for residual connections, which can add sub-layer inputs to respective sub-layer outputs, and layer normalization, which can stabilize and speed up training.

Still referring to FIG. 3, the decoder component 322 can be configured to receive outputs from the encoder component 312 and generate an output sequence, one token at a time. Similar to the encoder component 312, an output embedding layer 323 and positional encoding component 324 can be configured to convert output tokens from the encoder component 312 into dense vectors and add positional information. A second attention mechanism 126 (e.g., a masked self-attention mechanism, etc.) can be configured to ensure that the prediction for each particular token depends only on the known outputs up to that position (e.g., the decoder component 322 cannot "cheat" by looking ahead). A third attention mechanism 328 (e.g., encoder-decoder attention mechanism, etc.) can be configured to enable the decoder component 322 to focus on relevant parts of the input sequence (e.g., the encoder component 312 output) when generating each token of the output sequence. A second FFNN 330 (e.g., output/decoder FFNN), similar to the first FFNN 320, can be configured to process the output of the third attention mechanism 328 via a multi-layered network. Once again, residual connections and layer normalization can be applied in the same manner as in the encoder component 312.

It shall be appreciated that encodings in the transformer-based architecture of the LLM 300 of FIG. 300 refer to the representations of tokens at various stages. The input embeddings can include initial dense vector representations of input tokens. The positional encodings can be added to input embeddings to incorporate position information. Contextualized encodings can include representations produced by the attention mechanisms 318, 326, 328 and FFNN layers 320, 330, which can capture the context of each token in a sequence.

As previously discussed, the attention mechanisms 318, 326, 328 can enable the LLM 300 to focus on different parts of the sequence when processing a token. For example, attention can include Query (Q), Key (K), and Value (V) matrices that can be derived from the input embeddings by multiplying them with learned weight matrices. Scaled dotproduct attention can calculate attention scores by taking the dot product of the Query and Key matrices, scaling them down.

The LLM 300 can further include a softmax component 332 configured to get attention weights, which can be used to compute a weighted sum of the Value matrix and are applied to the output of the decoder component 322. The softmax function component 332, for example, can be configured to covert the attention scores into probabilities, ensuring that they sum to one. In the context of attention, the softmax function component 332 can ensure that the attention weights highlight the most relevant tokens while maintaining a probabilistic interpretation.

The LLM 300 can be adapted for a particular domain or context, such as a domain(s) specific to the system 100 of FIG. 1. In other words, the LLM 300 can be fine-tuned, which can adjust the pre-trained weights using domain-specific data to make determinations more effective for particular applications, such as particular repositories 314 (FIG. 1), software architectures 118 (FIG. 1), and/or requirements 120 (FIG. 1). For example, fine-tuning can involve collecting a large and diverse dataset relevant to the specific domain or context. For example, for a type of architecture or requirement, or for a particular repository structure, information associated with the architecture, requirements, and/or repository structure, could be used to train the LLM 300. This adaptation training data can be tokenized into smaller units (tokens) that the LLM 300 can process. The tokenization of the adaptation training data can use the same tokenization method as the base model of the LLM 300. The fine-tuning process can involve supervised fine-tuning (e.g., labeled data) where possible. The LLM 300 can then trained on the domain-specific data, typically under supervised learning techniques. Fine-tuning can be done using frameworks like Hugging Face's Transformers library, TensorFlow, or PyTorch. The fine tuning can involve conventional hyperparameter adjustments and validation of LLM 300 performance.

The LLM 300 can generate text (e.g., code in the target programming language) using a sophisticated next-word prediction mechanism. The LLM 300 can be trained on a vast dataset of text from various sources. During training, the LLM 300 can learn patterns, structures, and the statistical relationships between words and phrases in the text. This training process can involve adjusting the LLM 300 parameters to minimize the error in predicting the next word in a sequence of text. When given an input (e.g., a prompt and/or initial text), the LLM 300 can analyze the context using its learned patterns. In other words, the LLM 300 can consider the words and phrases that have already been provided to understand the context and meaning. Based on the context, the LLM 300 can generate a probability distribution over the potential next words. The LLM 300 can use this distribution to predict the most likely next word. This process can be repeated word-by-word to generate coherent and contextually relevant text (e.g., repository queries, software code, etc.). The LLM 300 can use different strategies to choose the next word from the probability distribution. For example, common strategies can include greedy sampling (choosing the word with the highest probability), top-k sampling (limiting the choices to the top k most probable words and sampling from them), top-p (nucleus) sampling (choosing words from the smallest set whose cumulative probability exceeds a certain threshold (p)), and/or temperature (adjusting the randomness of the predictions, where a lower temperature makes the model more conservative, while a higher temperature makes it more creative and diverse). The LLM 300 can repeat the process, using the newly generated word as part of the context for predicting the next word, continuing this until the desired length of text is generated or until it encounters a stopping condition (like a specific token indicating the end).

Figure 4:
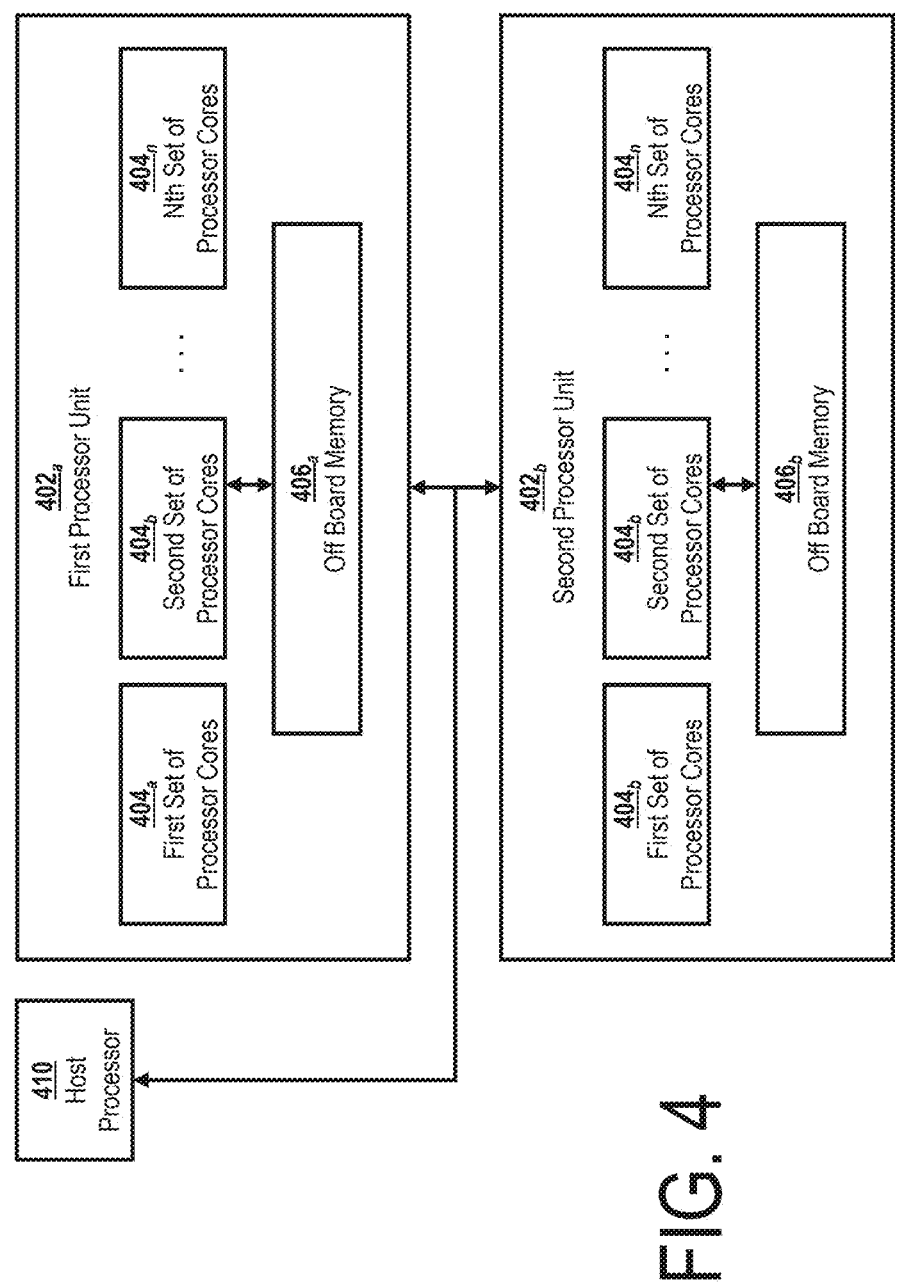
FIG. 4 is a block diagram of a sub-system architecture configured for use by the system of FIG. 1 according to one embodiment of the present disclosure.

Referring now to FIG. 4, a block diagram of a sub-system architecture 400 configured for use by the system 100 of FIG. 1 is depicted in accordance with at least one embodiment of the present disclosure. For example, the sub-system architecture 400 can be used by the backend computer system 102 (FIG. 1) to implement the embodiments described above, such as the functionality described in connection with FIGS. 1 and 3 and the method 200 of FIG. 2. According to the non-limiting aspect of FIG. 4, the sub-system architecture 400 can include one or more processor units 402$_a$, 402$_b$ that each can include, in the illustrated embodiment, multiple (N) sets of processor cores 404$_{a-n}$. Each processor unit 402$_a$, 402$_b$ can include on-board memory (ROM or RAM) (not shown) and off-board memory 406$_a$, 406$_b$ (which memory can include adequate VRAM for GPUs). The on-board memory can include primary, volatile and/or non-volatile, storage (e.g., storage directly accessible by the processor cores 404$_{a-n}$). The off-board memory 406$_a$, 406$_b$ can include secondary, non-volatile storage (e.g., storage that is not directly accessible by the processor cores 1004A-N), such as ROM, HDDs, SSD, flash, etc. The processor cores 404$_{a-n}$ can include be CPU cores, GPU cores, TPU cores, and/or AI accelerator cores (which can include TPUs, FPGAs, ASICs, and other types of processors). According to some embodiments, GPU cores can operate in parallel (e.g., a general-purpose GPU pipeline) and, hence, can typically process data more efficiently that a collection of CPU cores, but all the cores of the GPU can execute the same code at one time. According to the non-limiting aspects wherein the processor cores 404$u$-$n$ include AI accelerators, the AI accelerators can include a class of microprocessor designed to accelerate artificial neural networks. The AI accelerators can typically be employed as a co-processor in a device with a host processor 610, which can include a CPU, as well. An AI accelerator can include tens of thousands of matrix multiplier units that operate at lower precision than a CPU core, such as 8-bit precision in an AI accelerator versus 64-bit precision in a CPU core.

In various embodiments, the different processor cores 404 can be configured to train and/or implement different networks or subnetworks or components. For example, according to some non-limiting aspects, the first processor unit 402$_a$ can be configured to host and execute the encoder component 312 (FIG. 3) and the second processor unit 402$_b$ can be configured to host and execute the decoder component 322 (FIG. 3). However, according to other non-limiting aspects, a single processor unit 402$_a$, 402$_b$ can be configured to host and execute both the encoder component 312 (FIG. 3) and the decoder component 322 (FIG. 3).

In other words, the methods and functionality disclosed herein can be embodied as a set of instructions stored within a memory (e.g., an integral memory of the processing units 402$_a$, 402$_b$ or an off board memory 406$_a$, 406$_b$ coupled to the processing units 402$_a$, 402$_b$ or other processing units) coupled to one or more processors (e.g., at least one of the sets of processor cores 404$_{a-n}$ of the processing units 402$_a$, 402$_b$ or another processor(s) communicatively coupled to the processing units 402$_a$, 402$_b$), such that, when executed by the one or more processors, the instructions cause the processors to perform the aforementioned process by, for example, controlling the LLM 300 (FIG. 3) stored in the processing units 402$_a$, 402$_b$.

As previously described, the sub-system architecture 400 can be implemented with one processor unit. In embodiments where there are multiple processor units, the processor units could be co-located or distributed. For example, the processor units may be interconnected by electronic data networks, such as a LAN, WAN, the Internet, etc., using suitable wired and/or wireless data communication links. Data may be shared between the various processing units using suitable data links, such as data buses (preferably high-speed data buses) or network links (e.g., Ethernet).

The software for the various computer systems described herein and other computer functions described herein may be implemented in computer software using any suitable computer programming language such as .NET, C, C++, Python, and using conventional, functional, or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C#, COBOL, CUDA® (CUDA), Fortran, JAVA® (Java), Lisp, Pascal, Object Pascal, Haskell, ML; and examples of scripting languages include Bourne script, JAVASCRIPT®, PYTHON®, Ruby, LAU® (Lua), PHP, and PERL® (Perl).

Figure 5:
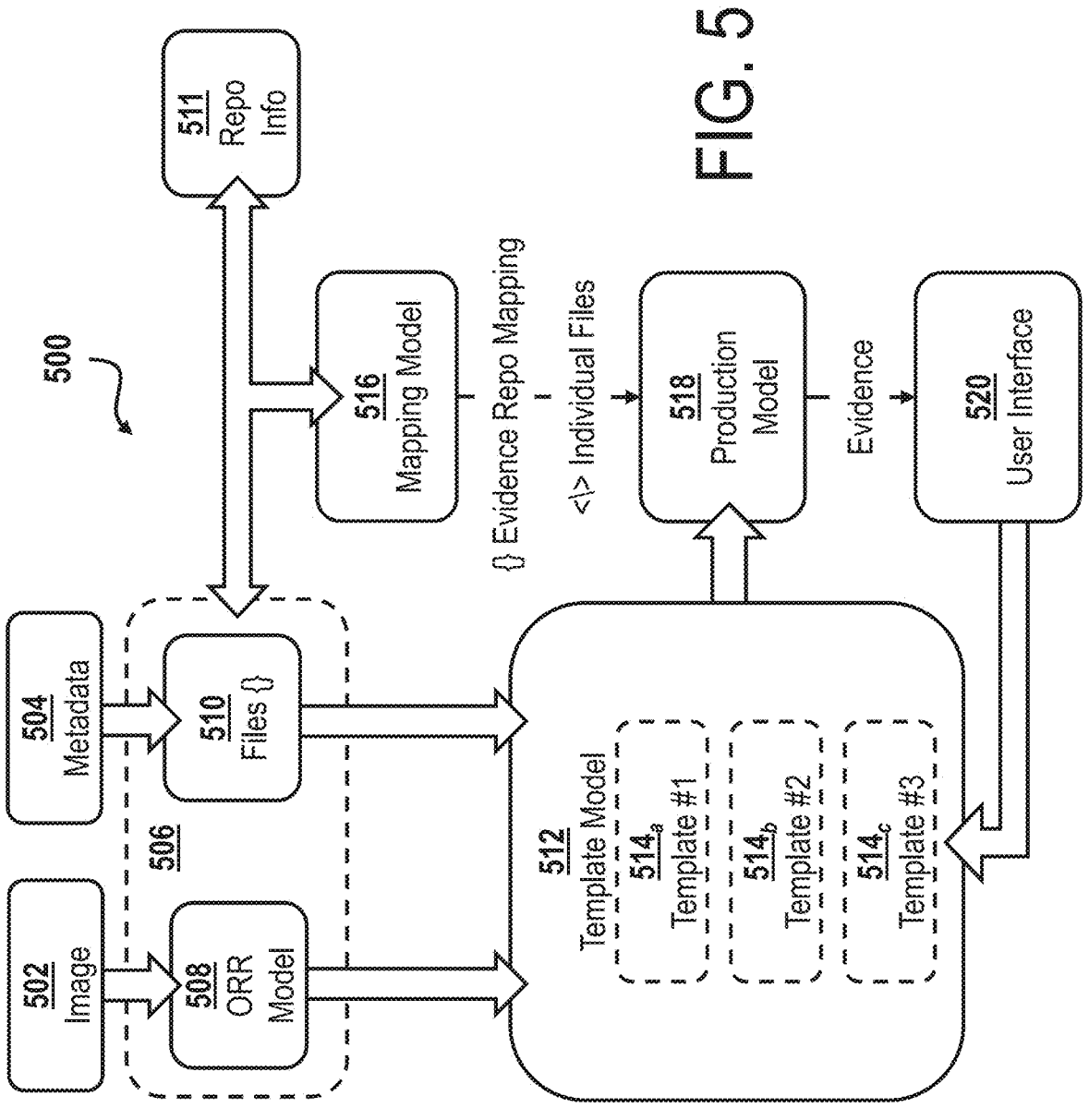
FIG. 5 is an architecture of the collection engine of the system of FIG. 1 according to at least one non-limiting aspect of the present disclosure.

Referring now to FIG. 5, an architecture 500 of the collection engine 104 of the system 100 of FIG. 1 is depicted in accordance with at least one embodiment of the present disclosure. Specifically, the architecture 500 of FIG. 5 illustrates various inputs, sources of inputs, and various models that could be implemented by the collection engine 104 (FIG. 1). For example, the collection engine can implement one or more models, such as an operational readiness review ("ORR") model 508, a mapping model 516, and/or a production model 518 to perform the functionality disclosed herein. Alternately, the functionality of two or more of the ORR model 508, mapping model 516, and production model 518 can be consolidated into a single model. It shall be appreciated that the ORR model 508, mapping model 516, and production model 518 can be configured as previously described with reference to FIG. 3.

According to the non-limiting embodiment of FIG. 5, the architecture 500 can include an input 506 to the architecture 500 of the collection engine 104 (FIG. 1), wherein the input includes outputs from the ORR model 508 generated based on an image 502 (e.g., an architecture diagram), and files 510 associated with architecture metadata 504. The image 502 and architecture metadata 504 can be included in the software architecture information 118 (FIG. 1) provided via the user computer device 112 (Figure). According to some non-limiting embodiments, the ORR model can be configured to perform a readiness review based on the image 502. The mapping model 516 can receive the image 502 and/or architecture metadata 504, as well as repository information 511 (e.g., metadata) associated with a structure of the repository 114 (FIG. 1). For example, the user inputs may include repository information 511 provided via the user interface 520, as will be described in further detail with reference to FIGS. 6A-C. However, according to some non-limiting embodiments, the mapping model 516 can be configured to autonomously determine what repository information 511 is relevant to the software under audit based on the input 506.

The architecture 500 of FIG. 5 can further include a template model 512 that also receives the input 506, which can autonomously select a template from a plurality of templates 514$_{a-c}$ based on the input 506 and use the selected template to generate a prompt. For example, each of the plurality of templates 514$_{a-c}$ can include a basis for the generation of prompts to be generated by the template model 512 and specifically tailored for a particular type of software or architecture. Thus, the template model 512 can select templates from the plurality of templates 514$_{a-c}$, and prompts thereof, that are best suited for the software architecture under audit. The template model 512 can further operate based on configurable settings associated with the plurality of templates 514$_{a-c}$, which can enable users to version control for prompts and incrementally improve the accuracy of evidences. The template model 512 not only improves the accuracy of evidence produced via the collection engine 104 (FIG. 1) but enhances efficiency by reducing computational resources otherwise spent on searching irrelevant repositories, and reduces the amount of manual labor necessary to establish code compliance. Template selection and prompt generation can be based on user inputs provided via a user interface 520, which may be displayed via the user computer device 112 (FIG. 1). For example, the user inputs may include one or more requirements 120 (FIG. 1) provided via the user interface 520, as will be described in further detail with reference to FIGS. 6A-C. However, according to some non-limiting embodiments, the template model 512 can be configured to autonomously determine what one or more requirements 120 (FIG. 1) relevant to the software under audit based on the input 506.

Upon receiving the input 506 and the repository information 511, the mapping model 516 of the architecture 500 of FIG. 5 can be configured to identify relevant repositories and map software architecture metadata to repository information, generating evidence-repository mapping information and individual files, such as code 116 (FIG. 1) or preliminary evidence retrieved from the repository 114 (FIG. 1) based on the evidence-repository mapping information and/or generated prompts. The evidence-repository mapping information and individual files can be provided to a production model 518, along with the generated prompts provided by the template model 512. As previously described, the prompts can include requests specifically tailored to the one or more requirements 120 (FIG. 1) relevant to the software under audit. Thus, the production model 518 can be configured to retrieve new evidence from the repository 114 (FIG. 1) with higher accuracy and precision, refine the preliminary evidence, and/or identify specific evidence responsive to the at least one requirement based on the evidence-repository mapping information, individual files, and prompts. Finally, the architecture 500 of FIG. 5 can present the produced evidence to a user for approval, potentially via a user interface 520, which may be displayed via the user computer device 112 (FIG. 1).

Referring now to FIGS. 6A-C, several user interfaces 600$_{a-c}$ configured for use with the system 100 of FIG. 1 are depicted in accordance with at least one embodiment. Specifically, the user interfaces 600$_{a-c}$ can be configured for display via the user computer device 112 (FIG. 1). According to FIG. 6A, a first user interface 600$_a$ can be configured for the provision of repository information. For example, the first user interface 600$_a$ can include a first column 602 comprising a plurality of widgets 604$_{a-e}$. Each widget of the plurality of widgets 604$_{a-e}$ can correspond to a particular repository connected to the system 100 (FIG. 1). Repository descriptions can be provided in a corresponding cell of a second column 606. Likewise, a specific location of each repository can be provided in a corresponding cell of a third column 608. A user can review the one or more repositories and interact with the widget of the plurality of widgets 604$_{a-e}$ that corresponds to a repository that is relevant to the software architecture under review. However, according to some non-limiting embodiments, the collection engine 104 (FIG. 1) can be configured to autonomously determine what repository information 511 (FIG. 5) is relevant to the software under audit based on the input 506 (FIG. 5).

According to FIG. 6B, a second user interface 600$_b$ can be configured for the provision of requirements relevant to the software architecture under review. For example, the second user interface 600$_b$ can include a first column 610 comprising a plurality of widgets 612$_{a-e}$. Each widget of the plurality of widgets 612$_{a-e}$ can correspond to a particular requirement that may or may not be relevant to the software under audit. Repository descriptions can be provided in a corresponding cell of a second column 614. A user can review the one or more requirements and interact with the widget of the plurality of widgets 612$_{a-e}$ that corresponds to a requirement that is relevant to the software architecture under review. However, according to some non-limiting embodiments, the collection engine 104 (FIG. 1) can be configured to autonomously determine what requirements are relevant to the software under audit based on the input 506 (FIG. 5).

According to FIG. 6C, a third user interface 600$_c$ can be configured for the evidence produced by the collection engine 104 (FIG. 1) in compliance with requirements relevant to the software architecture under review. For example, the third user interface 600$_c$ can include a first column 616 listing the requirements provided via the second user interface 600$_b$ or autonomously determined via the collection engine 104 (FIG. 1). A second column 618 can provide an indication as to whether the collection engine 104 (FIG. 1) found evidence in compliance with the corresponding requirement in the first column 616, a third column 620 providing a description of the found evidence, if applicable, and a fourth column 618 providing a location of the found evident including, for example, a formatted URL and/or a line number of the relevant code to be used as evidence. A fifth column 622 enables a user to provide comments on the found evidence and a sixth column 624 provides the user with a means of either approving or rejecting the particular means of evidence found. For example, if the evidence produced by the collection engine 104 (FIG. 1) is deemed sufficient to establish compliance with the requirement, the user may approve the evidence. However, if the evidence produced by the collection engine 104 (FIG. 1) is deemed insufficient to establish compliance with the requirement, the user may reject the evidence. The third user interface 600$_c$ can further include a first widget 626 that, upon interaction, will submit the evidence and a second widget 628 that, upon interaction, will export the evidence (e.g., to another application run by a component of the system 100).

Upon submission of the feedback provided via the third user interface 600$_c$, the collection engine 104 (FIG. 1) can be configured to generate a remedial action based on the feedback, including repeating the search for any requirement for which the initially produced evidence was rejected, updating at least one template of the plurality of templates 514$_{a-c}$ (FIG. 5), and/or generating a new prompt based on the feedback. Moreover, the collection engine 104 (FIG. 1) can be configured to train one or more models based on the feedback provided via the third user interface 600$_c$, to improve the accuracy of evidence produced in future searches for evidence relevant to a particular requirement, software architecture, or repository.

In various aspects, therefore, the present disclosure is directed to a method computer-implemented method of automating evidence collection for software compliance. The method can comprise, in various embodiments: extracting, via a collection engine comprising a large language model ("LLM") running on a backend computer system, metadata from a software architecture diagram received from a user computer device that is in communication with the backend computer system via an electronic data network; extracting, via the LLM, metadata from repository information associated with at least one repository of a plurality of repositories; mapping, via the LLM, the software architecture diagram to the at least one repository of the plurality of repositories based on the metadata extracted from software architecture and the metadata extracted from the at least one repository of the plurality of repositories; identifying, via the LLM, a template from a plurality of templates based on the mapping and at least one requirement for compliance; generating, via the LLM, a prompt to retrieve evidence from the plurality of repositories based on the identified template; and retrieving, via the LLM, evidence relevant to the at least one requirement from the plurality of repositories based on the prompt; generating, via the LLM, a output comprising the evidence relevant to the at least one requirement into an output; and transmitting, via the backend computer system and the electronic data network, the output to the user computer device for display via a user interface associated with the user computer device.

In various implementations, the method further comprises the steps of receiving, via the LLM, feedback associated with the output from the user computer device; and generating, via the collection engine, a remedial action based on the received feedback. In various implementations, the remedial action comprises generating, via the LLM, a second prompt to retrieve additional evidence from the plurality of repositories, in which case the method can further comprise: retrieving, via the LLM, additional evidence relevant to the at least one requirement from the plurality of repositories based on the second prompt; generating, via the LLM, a second output comprising the additional evidence relevant to the at least one requirement into a second output; and transmitting, via the backend computer system and the electronic data network, the second output to the user computer device for display via the user interface.

In various implementations, the action comprises updating, via the LLM, at least one template of the plurality of templates and/or retrieving, via the collection engine, additional evidence relevant to the at least one requirement from the plurality of repositories based on the prompt.

In various implementations, the evidence comprises preliminary evidence, in which case the method can further comprise: analyzing, via the LLM, the preliminary evidence for context and semantics; and identifying, via the LLM, specific evidence within the preliminary evidence based on the context and semantics, where the specific evidence is most relevant to the at least one requirement. Still further, the preliminary evidence can comprise a plurality of lines of code, and wherein the specific evidence comprises a subset of the plurality of lines of code. Still further, the output can comprise the subset of the plurality of lines of code. Further yet, the output can comprise a location associated with the subset of the plurality of lines of code.

In various implementations, method can further comprise the step of autonomously determining, via the LLM, the at least one requirement based on the metadata extracted from software architecture and the metadata extracted from the at least one repository of the plurality of repositories.

In various implementations, the at least one requirement for compliance is received via the user interface and provided by the user computer device.

In yet another general aspect, the present invention is directed to a backend computer system configured to automate evidence collection for software compliance. The backend computer system can comprise a processor and a memory configured to store a collection engine comprising a large language model ("LLM") that, when executed by the processor, causes the backend computer system to: extract metadata from a software architecture diagram received from a user computer device that is in communication with the backend computer system via an electronic data network; extract metadata from repository information associated with at least one repository of a plurality of repositories; map the software architecture diagram to the at least one repository of the plurality of repositories based on the metadata extracted from software architecture and the metadata extracted from the at least one repository of the plurality of repositories; identify a template from a plurality of templates based on the mapping and at least one requirement for compliance; generate a prompt to retrieve evidence from the plurality of repositories based on the identified template; and retrieve, via the LLM, evidence relevant to the at least one requirement from the plurality of repositories based on the prompt; generate a output comprising the evidence relevant to the at least one requirement into an output; and transmit, via the electronic data network, the output to the user computer device for display via a user interface associated with the user computer device.

In various implementations, when executed by the processor, the LLM further causes the backend computer system to: receive feedback associated with the output from the user computer device; and generate a remedial action based on the received feedback. The remedial action can comprise generating a second prompt to retrieve additional evidence from the plurality of repositories, and such that, when executed by the processor, the LLM further causes the backend computer system to: retrieve additional evidence relevant to the at least one requirement from the plurality of repositories based on the second prompt; generate a second output comprising the additional evidence relevant to the at least one requirement into a second output; and transmit the second output to the user computer device for display via the user interface.

In various implementations, the evidence comprises preliminary evidence, such that, when executed by the processor, the LLM further causes the backend computer system to: analyze the preliminary evidence for context and semantics; and identify specific evidence within the preliminary evidence based on the context and semantics, wherein the specific evidence is most relevant to the at least one requirement.

In yet another general aspect, the present invention is directed to system configured to automate evidence collection for software compliance. In various embodiments, the system comprises a user computer device, a plurality of repositories, a backend computer system communicatively coupled to the user computer device and the plurality of repositories via an electronic data network. The backend computer system comprises a processor, and a memory configured to store a collection engine comprising a large language model ("LLM") that, when executed by the processor, causes the backend computer system to: extract metadata from a software architecture diagram received from the user computer device; extract metadata from repository information associated with at least one repository of the plurality of repositories; map the software architecture diagram to the at least one repository of the plurality of repositories based on the metadata extracted from software architecture and the metadata extracted from the at least one repository of the plurality of repositories; identify a template from a plurality of templates based on the mapping and at least one requirement for compliance; generate a prompt to retrieve evidence from the plurality of repositories based on the identified template; and retrieve, via the LLM, evidence relevant to the at least one requirement from the plurality of repositories based on the prompt; generate a output comprising the evidence relevant to the at least one requirement into an output; and transmit, via the electronic data network, the output to the user computer device for display via a user interface associated with the user computer device.

In various implementations, when executed by the processor, the LLM further causes the backend computer system to: receive feedback associated with the output from the user computer device; and generate a remedial action based on the received feedback.

In various implementations, the remedial action comprises generating a second prompt to retrieve additional evidence from the plurality of repositories, such that, when executed by the processor, the LLM further causes the backend computer system to: retrieve additional evidence relevant to the at least one requirement from the plurality of repositories based on the second prompt; generate a second output comprising the additional evidence relevant to the at least one requirement into a second output; and transmit the second output to the user computer device for display via the user interface.

In various implementations, the evidence comprises preliminary evidence, and where, when executed by the processor, the LLM further causes the backend computer system to: analyze the preliminary evidence for context and semantics; and identify specific evidence within the preliminary evidence based on the context and semantics, wherein the specific evidence is most relevant to the at least one requirement.

In various implementations, the preliminary evidence comprises a plurality of lines of code, and where the specific evidence comprises a subset of the plurality of lines of code.

In various implementations, the preliminary evidence comprises a plurality of lines of code, and wherein the specific evidence comprises a subset of the plurality of lines of code.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. While various aspects have been described herein, it should be apparent that various modifications, alterations, and adaptations to those aspects may occur to persons skilled in the art with attainment of at least some of the advantages. The disclosed aspects are therefore intended to include all such modifications, alterations, and adaptations without departing from the scope of the aspects as set forth herein.

What is claimed is:

1. A computer-implemented method of automating evidence collection for software compliance for an enterprise, the method comprising:

extracting, via a collection engine comprising a large language model ("LLM") that has been fine-tuned using source code and related documentation specific to the enterprise and is executed by a processor of a backend computer system, metadata from a software architecture diagram received from a user computer device that is in communication with the backend computer system via an electronic data network;

extracting, via the LLM, metadata from repository information associated with at least one repository of a plurality of repositories, wherein the plurality of repositories are repositories of a source code management system storing source code for the enterprise;

mapping, via the LLM, the software architecture diagram to the at least one repository of the plurality of repositories based on the metadata extracted from software architecture and the metadata extracted from the at least one repository of the plurality of repositories;

identifying, via the LLM, a template from a plurality of templates based on the mapping and at least one requirement for compliance;

generating, via the LLM, a prompt by combining the identified template with the metadata extracted from the software architecture diagram and the repository information to form a repository-specific query identifying one or more repositories of the source code management system from which evidence is to be retrieved; and retrieving, via the LLM, evidence relevant to the at least one requirement from the plurality of repositories based on the prompt, wherein the evidence comprises relevant source code retrieved from the at least one repository;

generating, via the LLM, an output by compiling the evidence relevant to the at least one requirement into an output; and transmitting, via the backend computer system and the electronic data network, the output to the user computer device for display via a user interface associated with the user computer device.

2. The method of claim 1, further comprising:

receiving, via the LLM, feedback associated with the output from the user computer device; and generating, via the collection engine, a remedial action based on the received feedback.

3. The method of claim 2, wherein the remedial action comprises generating, via the LLM, a second prompt to retrieve additional evidence from the plurality of repositories, and wherein the method further comprises:

retrieving, via the LLM, additional evidence relevant to the at least one requirement from the plurality of repositories based on the second prompt;

generating, via the LLM, a second output comprising the additional evidence relevant to the at least one requirement into a second output; and transmitting, via the backend computer system and the electronic data network, the second output to the user computer device for display via the user interface.

4. The method of claim 2, wherein the action comprises updating, via the LLM, at least one template of the plurality of templates.

5. The method of claim 2, wherein the action comprises retrieving, via the collection engine, additional evidence relevant to the at least one requirement from the plurality of repositories based on the prompt.

6. The method of claim 2, wherein the evidence comprises preliminary evidence, and wherein the method further comprises:

analyzing, via the LLM, the preliminary evidence for context and semantics; and identifying, via the LLM, specific evidence within the preliminary evidence based on the context and semantics, wherein the specific evidence is most relevant to the at least one requirement.

7. The method of claim 6, wherein the preliminary evidence comprises a plurality of lines of code, and wherein the specific evidence comprises a subset of the plurality of lines of code.

8. The method of claim 7, wherein the output comprises the subset of the plurality of lines of code.

9. The method of claim 7, wherein the output comprises a location associated with the subset of the plurality of lines of code.

10. The method of claim 1, further comprising:

autonomously determining, via the LLM, the at least one requirement based on the metadata extracted from software architecture and the metadata extracted from the at least one repository of the plurality of repositories.

11. The method of claim 1, wherein the at least one requirement for compliance is received via the user interface and provided by the user computer device.

12. A backend computer system configured to automate evidence collection for software compliance for an enterprise, the backend computer system comprising:

a processor; and a memory configured to store a collection engine comprising a large language model ("LLM") that has been fine-tuned using source code and related documentation specific to the enterprise and that, when executed by the processor, causes the backend computer system to:

extract metadata from a software architecture diagram received from a user computer device that is in communication with the backend computer system via an electronic data network;

extract metadata from repository information associated with at least one repository of a plurality of repositories, wherein the plurality of repositories are repositories of a source code management system storing source code for the enterprise;

map the software architecture diagram to the at least one repository of the plurality of repositories based on the metadata extracted from software architecture and the metadata extracted from the at least one repository of the plurality of repositories;

identify a template from a plurality of templates based on the mapping and at least one requirement for compliance;

generate a prompt to retrieve evidence from the plurality of repositories based on the identified template by combining the identified template with the metadata extracted from the software architecture diagram and the repository information to form a repository-specific query identifying one or more repositories of the source code management system from which evidence is to be retrieved; and retrieve, via the LLM, evidence relevant to the at least one requirement from the plurality of repositories based on the prompt, wherein the evidence comprises relevant source code retrieved from the at least one repository;

generate an output by compiling the evidence relevant to the at least one requirement into an output; and transmit, via the electronic data network, the output to the user computer device for display via a user interface associated with the user computer device.

13. The backend computer system of claim 12, wherein, when executed by the processor, the LLM further causes the backend computer system to:

receive feedback associated with the output from the user computer device; and generate a remedial action based on the received feedback.

14. The backend computer system of claim 13, wherein the remedial action comprises generating a second prompt to retrieve additional evidence from the plurality of repositories, and wherein, when executed by the processor, the LLM further causes the backend computer system to:

retrieve additional evidence relevant to the at least one requirement from the plurality of repositories based on the second prompt;

generate a second output comprising the additional evidence relevant to the at least one requirement into a second output; and transmit the second output to the user computer device for display via the user interface.

15. The backend computer system of claim 12, wherein the evidence comprises preliminary evidence, and wherein, when executed by the processor, the LLM further causes the backend computer system to:

analyze the preliminary evidence for context and semantics; and identify specific evidence within the preliminary evidence based on the context and semantics, wherein the specific evidence is most relevant to the at least one requirement.

16. The backend computer system of claim 15, wherein the preliminary evidence comprises a plurality of lines of code, and wherein the specific evidence comprises a subset of the plurality of lines of code.

17. A system configured to automate evidence collection for software compliance for an enterprise, the system comprising:

a user computer device;

a plurality of repositories;

a backend computer system communicatively coupled to the user computer device and the plurality of repositories via an electronic data network, wherein the backend computer system comprises a processor, and a memory configured to store a collection engine comprising a large language model ("LLM") that has been fine-tuned using source code and related documentation specific to the enterprise and that, when executed by the processor, causes the backend computer system to:

extract metadata from a software architecture diagram received from the user computer device;

extract metadata from repository information associated with at least one repository of the plurality of repositories, wherein the plurality of repositories are repositories of a source code management system storing source code for an enterprise;

map the software architecture diagram to the at least one repository of the plurality of repositories based on the metadata extracted from software architecture and the metadata extracted from the at least one repository of the plurality of repositories;

identify a template from a plurality of templates based on the mapping and at least one requirement for compliance;

generate a prompt to retrieve evidence from the plurality of repositories based on the identified template; and retrieve, via the LLM, evidence relevant to the at least one requirement from the plurality of repositories based on the prompt;

generate an output by compiling the evidence relevant to the at least one requirement into an output by combining the identified template with the metadata extracted from the software architecture diagram and the repository information to form a repository-specific query identifying one or more repositories of the source code management system from which evidence is to be retrieved; and transmit, via the electronic data network, the output to the user computer device for display via a user interface associated with the user computer device, wherein the output comprises relevant source code retrieved from the at least one repository.

18. The system of claim 17, wherein, when executed by the processor, the LLM further causes the backend computer system to:

receive feedback associated with the output from the user computer device; and generate a remedial action based on the received feedback.

19. The system of claim 18, wherein the remedial action comprises generating a second prompt to retrieve additional evidence from the plurality of repositories, and wherein, when executed by the processor, the LLM further causes the backend computer system to:

retrieve additional evidence relevant to the at least one requirement from the plurality of repositories based on the second prompt;

generate a second output comprising the additional evidence relevant to the at least one requirement into a second output; and transmit the second output to the user computer device for display via the user interface.

20. The system of claim 17, wherein the evidence comprises preliminary evidence, and wherein, when executed by the processor, the LLM further causes the backend computer system to:

analyze the preliminary evidence for context and semantics; and identify specific evidence within the preliminary evidence based on the context and semantics, wherein the specific evidence is most relevant to the at least one requirement.

21. The system of claim 20, wherein the preliminary evidence comprises a plurality of lines of code, and wherein the specific evidence comprises a subset of the plurality of lines of code.

* * * * *